(12) United States Patent
Ito et al.

(10) Patent No.: US 10,097,298 B2
(45) Date of Patent: Oct. 9, 2018

(54) MANAGEMENT DEVICE, SYSTEM, AND METHOD

(71) Applicant: Kabushiki Kaisha Toshiba, Minato-ku (JP)

(72) Inventors: Masashi Ito, Yokohama (JP); Akira Kawarada, Fuchu (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 141 days.

(21) Appl. No.: 14/982,433

(22) Filed: Dec. 29, 2015

(65) Prior Publication Data

US 2016/0359575 A1    Dec. 8, 2016

(30) Foreign Application Priority Data

Jun. 5, 2015  (JP) ................................. 2015-115143

(51) Int. Cl.

| H04J 3/06 | (2006.01) |
|---|---|
| H04W 48/08 | (2009.01) |
| H04L 29/06 | (2006.01) |
| H04W 24/08 | (2009.01) |
| H04W 72/04 | (2009.01) |
| H04W 84/12 | (2009.01) |
| H04L 12/26 | (2006.01) |

(52) U.S. Cl.

CPC ............ *H04J 3/0667* (2013.01); *H04L 69/28* (2013.01); *H04W 48/08* (2013.01); *H04L 43/067* (2013.01); *H04W 24/08* (2013.01); *H04W 72/044* (2013.01); *H04W 84/12* (2013.01)

(58) Field of Classification Search

CPC ...... H04J 3/0644; H04J 3/0658; H04L 7/0037
See application file for complete search history.

(56) References Cited

U.S. PATENT DOCUMENTS

| 6,031,863 | A | * | 2/2000 | Jusa | ..................... | H04B 1/7156 |
|---|---|---|---|---|---|---|
| | | | | | | 370/338 |
| 2010/0054237 | A1 | * | 3/2010 | Han | ..................... | H04J 3/0638 |
| | | | | | | 370/350 |
| 2013/0083780 | A1 | * | 4/2013 | Luo | ................... | H04W 72/0406 |
| | | | | | | 370/336 |
| 2013/0195443 | A1 | * | 8/2013 | Yin | ..................... | H04J 3/0667 |
| | | | | | | 398/25 |
| 2013/0336341 | A1 | * | 12/2013 | Kamada | ............... | H04J 3/0667 |
| | | | | | | 370/503 |
| 2015/0223089 | A1 | * | 8/2015 | Chakraborty | ......... | H04W 24/08 |
| | | | | | | 370/252 |

FOREIGN PATENT DOCUMENTS

JP    2004-212198    7/2004

* cited by examiner

*Primary Examiner* — Jae Y Lee
*Assistant Examiner* — Jean F Voltaire
(74) *Attorney, Agent, or Firm* — Oblon, McClelland, Maier & Neustadt, L.L.P.

(57) ABSTRACT

According to an embodiment, a management device includes a calculator and a notifier. The calculator calculates a time offset for each of a plurality of master devices each performing, when a measured time reaches a certain time, time synchronization with a slave device, which is a management target, at the measured time. The notifier notifies each master device of a change notification causing the master device to change the measured time in the master device to a time obtained by offsetting the measured time with the time offset.

12 Claims, 8 Drawing Sheets

MANAGEMENT DEVICE, SYSTEM, AND METHOD

CROSS-REFERENCE TO RELATED APPLICATIONS

This application is based upon and claims the benefit of priority from Japanese Patent Application No. 2015-115143, filed on Jun. 5, 2015; the entire contents of which are incorporated herein by reference.

FIELD

Embodiments described herein relate generally to a management device, a management system, and a management method.

BACKGROUND

To avoid confliction among communication frames such as synchronization messages for time synchronization when each of a plurality of mater devices performs time synchronization with a slave device which is a management target, a technique has been known that sets different times for different master devices to transmit the communication frame for time synchronization.

However, because different times are set for different master devices to transmit the communication frame for time synchronization in the conventional technique, such a conventional technique is not compliant with a standard under which time synchronization timing should be set at a given time, e.g., the time synchronization should be performed at a predetermined time. Under such a standard, it is difficult to avoid the occurrence of confliction due to the time synchronization.

DETAILED DESCRIPTION

According to an embodiment, a management device includes a calculator and a notifier. The calculator calculates a time offset for each of a plurality of master devices each performing, when a measured time reaches a certain time, time synchronization with a slave device, which is a management target, at the measured time. The notifier notifies each master device of a change notification causing the master device to change the measured time in the master device to a time obtained by offsetting the measured time with the time offset.

Various embodiments will be described in detail with reference to the accompanying drawings.

First Embodiment

Figure 1:
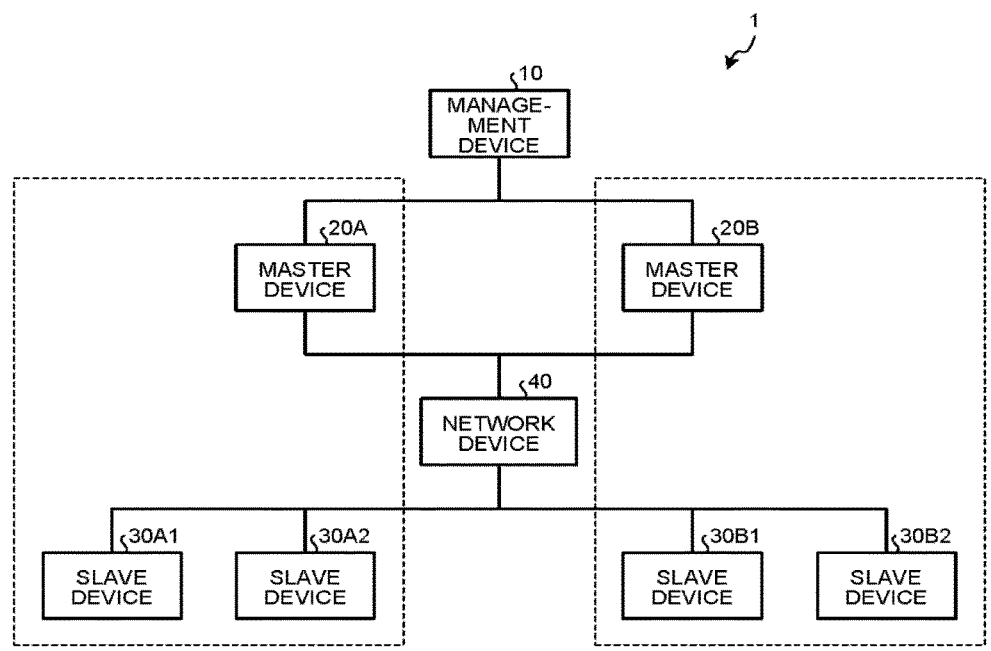
FIG. 1 is a schematic diagram illustrating an exemplary structure of a management system in a first embodiment.

FIG. 1 is a schematic diagram illustrating an exemplary structure of a management system 1 in a first embodiment. As illustrated in FIG. 1, the management system 1 includes a management device 10, master devices 20A and 20B, slave devices 30A1, 30A2, 30B1, and 30B2, and a network device 40.

In the following description, the master devices 20A and 20B are simply described as the master device 20 in some cases when they do not need to be differentiated from each other. Likewise, the slave devices 30A1, 30A2, 30B1, and 30B2 are simply described as the slave device 30, the slave devices 30A1 and 30A2 are simply described as the slave device 30A, and the slave devices 30B1 and 30B2 are simply described as the slave device 30B in some cases when they do not need to be differentiated from each other.

In the example illustrated in FIG. 1, the management system 1 includes two master devices 20, four slave devices 30, and the single network device 40. The numbers of respective devices are, however, not limited to those in this example.

The master device 20 is a computer such as a server that measures a time for time synchronization. When a measured time, which is the time measured by the master device 20, reaches a certain time, the master device 20 performs the time synchronization with the slave devices 30, which are management targets, at the measured time via the network device 40. As a result, the slave device 30 acquires the measured time in the master device 20 and synchronizes its own time with the acquired measured time. The slave device 30 is industrial equipment, for example; however, not limited to this example.

In the first embodiment, the explanation is given for an example in which the slave devices 30 managed by the master device 20A are the slave devices 30A1 and 30A2; the master device 20A performs the time synchronization with the slave devices 30A1 and 30A2; the slave devices 30 managed by the master device 20B are the slave devices 30B1 and 30B2; and the master device 20B performs the time synchronization with the slave devices 30B1 and 30B2. However, the configuration is not limited thereto.

The management device 10 is a computer such as a server that manages a time offset of the master device 20. In the first embodiment, the management device 10 sets different time offsets from each other to the master devices 20A and 20b, so that the measured times of the master devices 20A and 20b are shifted from each other. As a result, even under the standard under which time synchronization timing should be set at a given time, e.g., the time synchronization time should be performed at a predetermined time, the time synchronizations of the respective master devices 20A and 20B can be shifted from each other, thereby making it possible to avoid the occurrence of the confliction due to the time synchronizations.

The network device 40 relays communication. The network device 40 is a switching device, for example. The network device 40 is, however, not limited to this.

Figure 2:
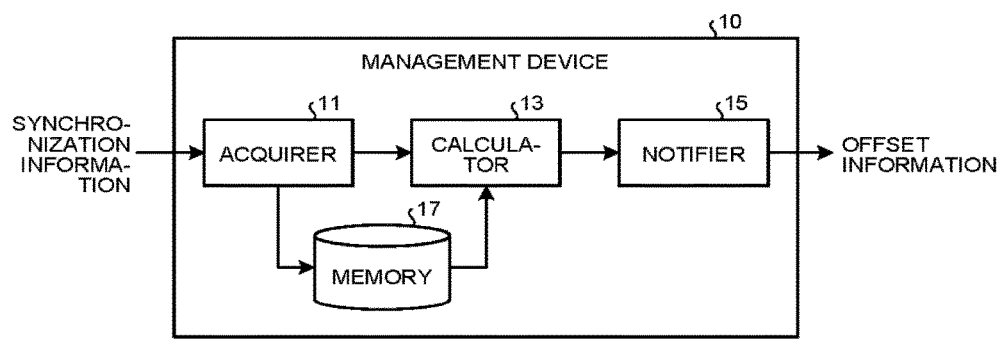
FIG. 2 is a schematic diagram illustrating an exemplary structure of a management device in the first embodiment.

FIG. 2 is a schematic diagram illustrating an exemplary structure of the management device 10 in the first embodiment. As illustrated in FIG. 2, the management device 10 includes an acquirer 11 (an example of a second acquirer), a calculator 13 (an example of a first calculator), a notifier 15 (an example of a first notifier), and a memory 17.

The acquirer 11, the calculator 13, and the notifier 15 may be implemented by causing a processing unit such as a central processing unit (CPU) to execute a program, i.e., implemented by software, by hardware such as an integrated circuit (IC), or by both of the software and the hardware.

The memory 17 can be achieved with a storage device capable of magnetically, optically or electrically storing data, such as a hard disk drive (HDD), a solid state drive (SSD), a memory card, an optical disc, a random access memory (RAM), or a read only memory (ROM).

The acquirer 11 acquires, for each master device 20, synchronization information on the time synchronization, stores the synchronization information in the memory 17, and outputs the synchronization information to the calculator 13. The synchronization information includes a master ID that identifies the master device 20 and period information that indicates a synchronization period in which the time synchronization is performed.

In the first embodiment, the acquirer 11 acquires the synchronization information from each master device 20. The acquisition manner is, however, not limited to this. The acquirer 11 may acquire the synchronization information input by a network administrator via an input unit (not illustrated) for each master device 20.

The calculator 13 calculates, for each master device 20, the time offset. Specifically, the calculator 13 calculates, for each master device 20, the time offset on the basis of the synchronization information acquired by the acquirer 11. The calculator 13 calculates, for each master device 20, the time offset using expression (1), for example.

$$\text{Time offset} = (\text{synchronization period}_i/\text{the number of pieces of acquired synchronization information}) \times (i-1) \quad (1)$$

In expression (1), the number of pieces of acquired synchronization information is the number of pieces of synchronization information stored in the memory 17. Specifically, the number of pieces of acquired synchronization information is the number of master IDs stored in the memory 17. In expression (1), i is a natural number equal to or smaller than the number of pieces of acquired synchronization information, and is a natural number unique to the master device 20 from which the synchronization information indicating the synchronization period$_i$ is acquired. Thus, (i−1) is a natural number smaller than the number of pieces of acquired synchronization information.

When the synchronization periods are equal between the respective master devices 20 and the time offsets are calculated using expression (1), the synchronization timing of each master device 20 is assigned in such a manner that the respective master devices 20 perform the time synchronizations at the same interval within the synchronization period.

In the first embodiment, when the acquirer 11 acquires the synchronization information, the calculator 13 calculates the respective time offsets for one or more master devices 20 from each of which the synchronization information is acquired (specifically, one or more master devices 20 the master IDs of which are stored in the memory 17).

Alternatively, the calculator 13 may calculate the time offset, for each master device 20, on the basis of uniformly distributed random numbers.

The notifier 15 notifies each master device 20 of a change notification that causes the master device 20 to change the measured time to a time obtained by offsetting the measured time with the time offset. In the first embodiment, the notifier 15 notifies each master device 20 of offset information that indicates the time offset calculated by the calculator 13.

In the first embodiment, every time the time offset is calculated by the calculator 13, the notifier 15 notifies the master device 20 for which the time offset is calculated.

Alternatively, the notifier 15 may notify a network administrator of the change notification by transmitting the change notification with an e-mail or causing a display (not illustrated) to display the change notification. The network administrator may, then, manually set the time offset for each master device 20.

Figure 3:
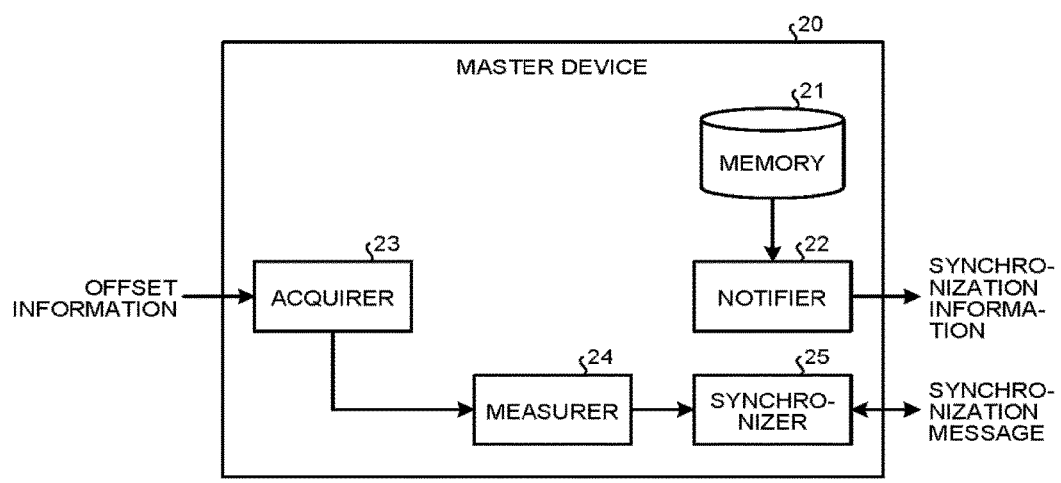
FIG. 3 is a schematic diagram illustrating an exemplary structure of a master device in the first embodiment.

FIG. 3 is a schematic diagram illustrating an exemplary structure of the master device 20 in the first embodiment. As illustrated in FIG. 3, the master device 20 includes a memory 21, a notifier 22 (an example of a second notifier), an acquirer 23 (an example of a first acquirer), a time measurer 24, and a synchronizer 25.

The memory 21 can be implemented by any of the storage devices capable of magnetically, optically, or electrically storing data, such as an HDD, an SSD, a memory card, an optical disc, a RAM, and a ROM.

The notifier 22, the acquirer 23, the time measurer 24, and the synchronizer 25 may be implemented by causing a processing unit such as a CPU to execute a program, i.e., achieved by software, by hardware such as an IC, or by both of the software and the hardware.

The memory 21 stores therein the synchronization information on the master device 20.

The notifier 22 notifies the management device 10 of the synchronization information on the master device 20. Specifically, the notifier 22 acquires the synchronization information on the master device 20 from the memory 21, and notifies the management device 10 of the acquired synchronization information.

The acquirer 23 acquires the offset information on the master device 20 from the management device 10.

The time measurer 24 measures a time, and changes the measured time to a time obtained by offsetting the measured time with the time offset indicated by the offset information.

When the changed measured time reaches a certain time, the synchronizer 25 performs the time synchronization with the slave device 30, which is a management target, at the changed measured time.

Specifically, when the changed measured time reaches a certain time, the synchronizer 25 notifies the slave device 30, which is a management target, of a start of the time synchronization. As a result, the slave device 30 which is a management target transmits, to the master device 20, the synchronization message for requesting the measured time for time synchronization from the master device 20. The synchronizer 25, thus, transmits, to the slave device 30 which is a management target, a synchronization message including a time stamp of the changed measured time. The slave device 30 estimates the current changed measured time in the master device 20 from the time stamp of the changed measured time and a communication delay time period required for receiving the synchronization message including the time stamp of the changed measured time, synchronizes its own time with the estimated changed measured time, and notifies the master device 20 of the completion of the synchronization.

As described above, when the synchronization periods are equal between the respective master devices 20 and the time offsets are calculated using expression (1), the synchronization timing of each master device 20 is assigned in such a manner that the respective master devices 20 perform the time synchronization at the same interval within the synchronization period. The respective master devices 20, thus, as illustrated in FIG. 4, transmit the synchronization messages to the corresponding slave devices 30, which are management targets, at the same interval within the synchronization period to perform the time synchronizations with the corresponding slave devices 30 which are management targets.

Figure 4:
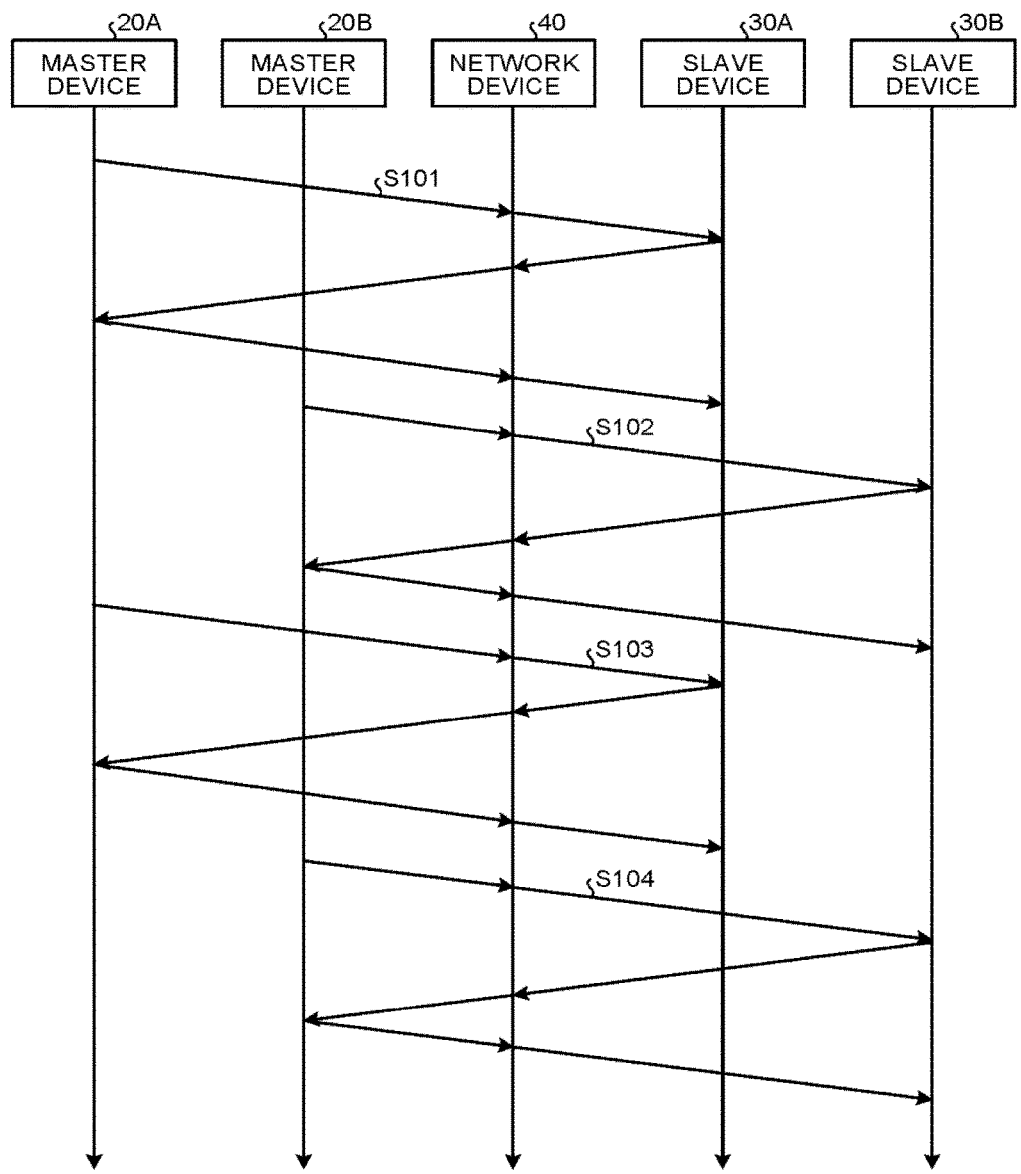
FIG. 4 is an explanatory view of time synchronization timing in the first embodiment.

In the example illustrated in FIG. 4, the master device 20A performs the time synchronization with the slave device 30A via the network device 40 in the first half of the first synchronization period (step S101), while the master device 20B performs the time synchronization with the slave device 30B via the network device 40 in the second half of the first synchronization period (step S102). In the first half of the next synchronization period, the master device 20A performs the time synchronization with the slave device 30A via the network device 40 (step S103), while the master device 20B performs the time synchronization with the slave device 30B via the network device 40 in the second half of the next synchronization period (step S104).

In the first embodiment, the measured times of the respective master devices 20 are shifted from each other due to the time offsets, in this way. As a result, communication frames for time synchronization such as the synchronization messages do not compete with each other in the network device 40. Consequently, the first embodiment makes it possible for the slave device 30 to increase time synchronization accuracy in the time synchronization with the master device 20.

In contrast, when the measured times of the respective master devices 20 are not shifted from each other but are equal to each other unlike the first embodiment in which the measured times of the respective master devices 20 are shifted from each other due to the time offsets, the respective master devices 20 perform the time synchronization with the corresponding slave devices 30 at the same timing. As a result, it is expected that the communication frames for time synchronization such as the synchronization messages compete with each other in the network device 40. In such a case, it is difficult for the slave device 30 to increase the time synchronization accuracy in the time synchronization with the master device 20.

The following describes in detail a reason why the slave device 30 can increase the time synchronization accuracy in the time synchronization with the master device 20 when the communication frames for time synchronization such as the synchronization messages do not compete with each other in the network device 40.

The slave device 30 transmits, to the master device 20, the synchronization message that requests the measured time for time synchronization from the master device 20, and receives, from the master device 20, the synchronization message including the time stamp of the changed measured time. The slave device 30 estimates the current changed measured time in the master device 20 from the time stamp of the changed measured time and the communication delay time period required for receiving the synchronization message including the time stamp of the changed measured time, and synchronizes its own time with the estimated changed measured time.

The current reference time, which is the changed measured time in the master device 20, is represented by expression (2).

Current reference time=time stamp of changed measured time+communication delay time period (2)

The communication delay time period is actually a time period of the synchronization message required in the backward route, i.e., a time period from when the master device 20 transmits the synchronization message including the time stamp of the changed measured time to when the slave device 30 receives the synchronization message. The slave device 30, however, cannot know a difference between its own measured time and the time measured by the master device 20 at this time, thereby making it impossible to directly measure the communication delay time period.

The communication delay time period is, thus, estimated as half of a round-trip time period of the synchronization message as illustrated in expression (3). The round-trip time period of the synchronization message is a time period from when the slave device 30 transmits the synchronization message that requests the measured time for time synchronization from the master device 20 to when the slave device 30 receives the synchronization message that includes the time stamp of the changed measured time. The slave device 30, thus, can directly measure the round-trip time period of the synchronization message.

Communication delay time period=round-trip time period of synchronization message/2 (3)

When the communication delay time period is estimated in accordance with expression (3), the communication delay time period cannot be correctly estimated unless a time period required in the forward route and a time period required in the backward route coincide with each other. The time period of the synchronization message required in the forward route is a time period from when the slave device 30 transmits, to the master device 20, the synchronization message that requests the measured time for time synchronization from the master device 20 to when the master device 20 receives the synchronization message.

When the communication frames for time synchronization (hereinafter described as the "synchronization messages") such as the synchronization messages compete with each other in the network device 40 that relays the synchronization messages, fluctuations occur in time for queuing the synchronization messages. As a result, a case can occur where the time period of the synchronization message required in the forward route and the time period of the synchronization message required in the backward route do not coincide.

When the time period of the synchronization message required in the forward route and the time period of the synchronization message required in the backward route do not coincide, the communication delay time period represented by expression (3) includes a delay difference that is a variation in the communication delay. The delay difference is represented by expression (4). Thus, expression (3) can be transformed into expression (5) using expression (4).

Delay difference=time period of synchronization message required in forward route−time period of synchronization message required in backward route (4)

Communication delay time period=time period of synchronization message required in backward route+delay difference/2 (5)

When the synchronization messages compete with each other in the network device 40, fluctuations occur in time for queuing the synchronization messages, thereby causing the time period of the synchronization message required in the forward route and the time period of the synchronization message required in the backward route to tend not to coincide. As a result, delay difference/2 (specifically, the absolute value of delay difference/2) tends to increase.

This causes the difference in communication delay time period estimated by the slave device 30 to tend to increase, thereby reducing the accuracy of the communication delay time period. As a result, it is difficult for the slave device 30 to increase the time synchronization accuracy in the time synchronization with the master device 20.

In contrast, when the synchronization messages do not compete with each other in the network device 40, fluctuations hardly occur in time for queuing the synchronization messages, thereby causing the time period of the synchronization message required in the forward route and the time period of the synchronization message required in the backward route to tend to coincide. As a result, delay difference/2 (specifically, the absolute value of delay difference/2) tends to decrease.

This causes the difference in communication delay time period estimated by the slave device 30 to tend to decrease, thereby increasing the accuracy of the communication delay time period. As a result, the slave device 30 can increase the time synchronization accuracy in the time synchronization with the master device 20.

Figure 5:
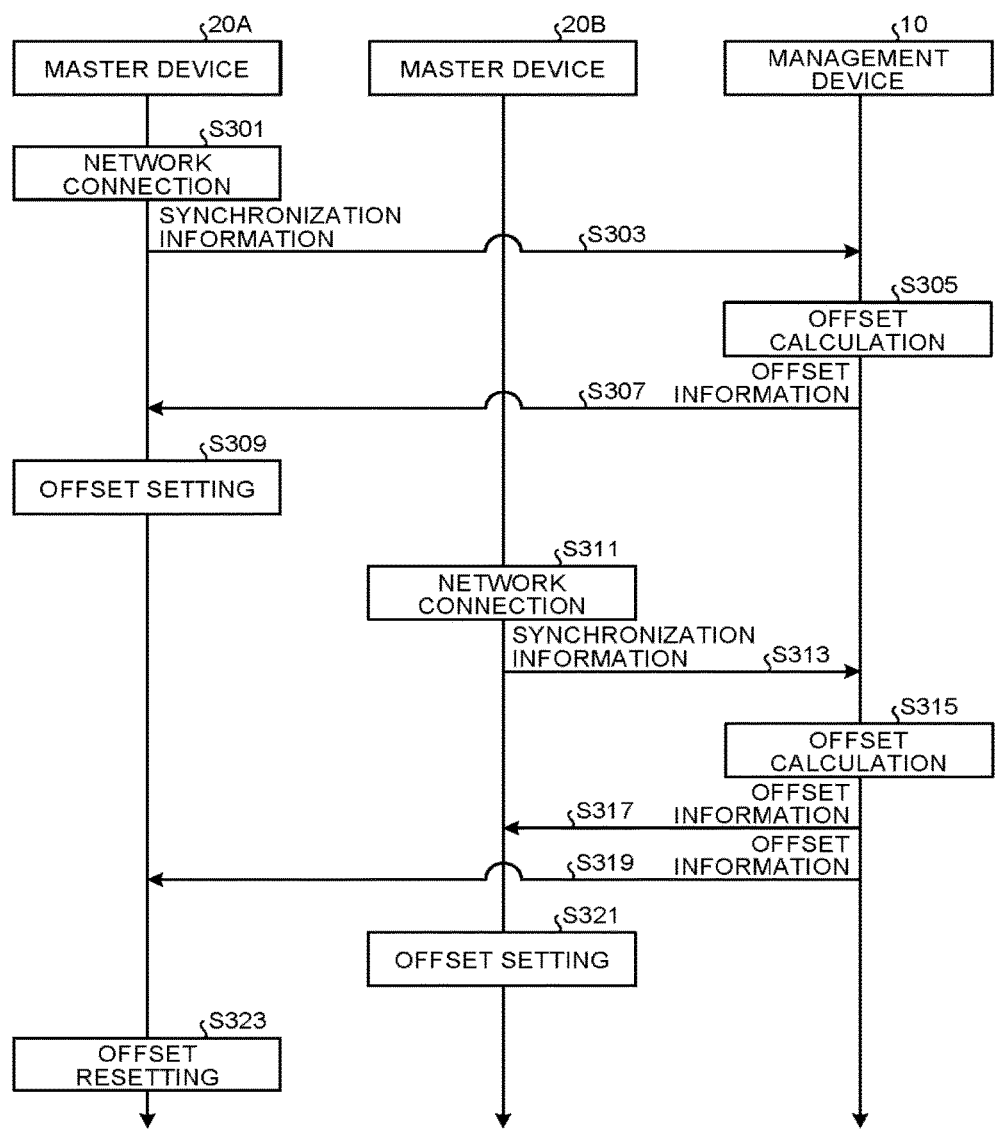
FIG. 5 is a sequence diagram illustrating an example of processing performed by the management system in the first embodiment.

FIG. 5 is a sequence diagram illustrating an exemplary flow of a procedure of processing performed by the management system 1 in the first embodiment.

When the master device 20A is connected to the network (step S301), the notifier 22 of the master device 20A acquires the synchronization information on the master device 20A from the memory 21, and notifies the management device 10 of the synchronization information. The acquirer 11 of the management device 10 acquires the synchronization information (step S303).

The calculator 13 of the management device 10 calculates the time offset using expression (1) (step S305). Here, i of the master device 20A is one. The time offset for the master device 20A is, thus, zero.

The notifier 15 of the management device 10 notifies the master device 20A of the offset information indicating the time offset calculated by the calculator 13. The acquirer 23 of the master device 20A acquires the offset information (step S307).

The time measurer 24 of the master device 20A sets the time offset indicated by the offset information and changes the measured time to a time obtained by offsetting the measured time with the time offset indicated by the offset information (step S309).

When the changed measured time reaches a certain time, the synchronizer 25 of the master device 20A performs the time synchronization with the slave device 30A at the changed measured time, which is not illustrated in FIG. 5.

When the master device 20B is connected to the network (step S311), the notifier 22 of the master device 20B acquires the synchronization information on the master device 20B from the memory 21, and notifies the management device 10 of the synchronization information. The acquirer 11 of the management device 10 then acquires the synchronization information (step S313).

The calculator 13 of the management device 10 calculates the time offsets of the master devices 20A and 20B using expression (1) (step S315). Here, i of the master device 20A is one, i of the master device 20B is two, and the number of pieces of acquired synchronization information is two. As a result, the time offset for the master device 20A is zero while the time offset for the master device 20B is synchronization period$_2$/2.

The notifier 15 of the management device 10 notifies the master device 20B of the offset information indicating the time offset calculated by the calculator 13 for the master device 20B. The acquirer 23 of the master device 20B acquires the offset information (step S317).

The notifier 15 of the management device 10 notifies the master device 20A of the offset information indicating the time offset calculated by the calculator 13 for the master device 20A. The acquirer 23 of the master device 20A acquires the offset information (step S319).

The time measurer 24 of the master device 20B sets the time offset indicated by the offset information and changes the measured time to a time obtained by offsetting the measured time with the time offset indicated by the offset information (step S321).

The time measurer 24 of the master device 20A resets the time offset indicated by the offset information, and changes the measured time to a time obtained by offsetting the measured time with the time offset indicated by the offset information (step S323).

When the changed measured time reaches a certain time, the synchronizer 25 of the master device 20A performs the time synchronization with the slave device 30A at the changed measured time while the synchronizer 25 of the master device 20B performs the time synchronization with the slave device 30B at the changed measured time as illustrated in FIG. 4, which is not illustrated in FIG. 5.

As described above, according to the first embodiment, the management device 10 sets the time offsets differing from each other to the master devices 20A and 20B, so that the measured times in the master devices 20A and 20B are shifted from each other. The first embodiment, thus, makes it possible for the time synchronizations of the respective master devices 20A and 20B to be shifted from each other even under the standard under which the time synchronization timing should be set at a given time, e.g., the time synchronization should be performed at a predetermined time, thereby making it possible to avoid the occurrence of confliction due to time synchronizations. Consequently, according to the first embodiment, it is possible for the slave device 30 to increase the time synchronization accuracy in the time synchronization with the master device 20.

Second Embodiment

In a second embodiment, the explanation is given for an example in which the resetting of the time offset is redone when confliction due to the time synchronizations is likely to occur by the resetting of the time offset. In the following description, differences from the first embodiment are mainly described. The same names and reference numerals as in the first embodiment are given to the elements having the same function, and description thereof is omitted.

Figure 6:
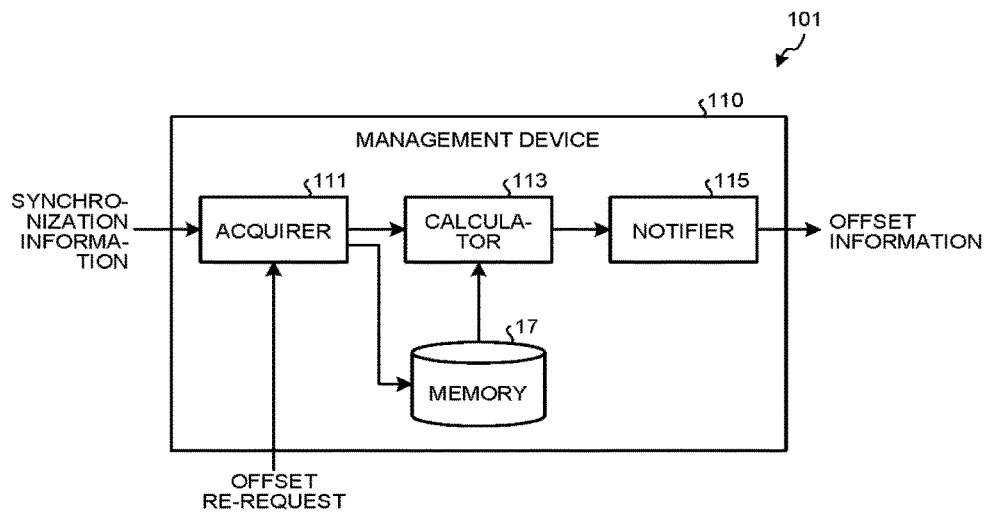
FIG. 6 is a schematic diagram illustrating an exemplary structure of a management device in a second embodiment.
Figure 7:
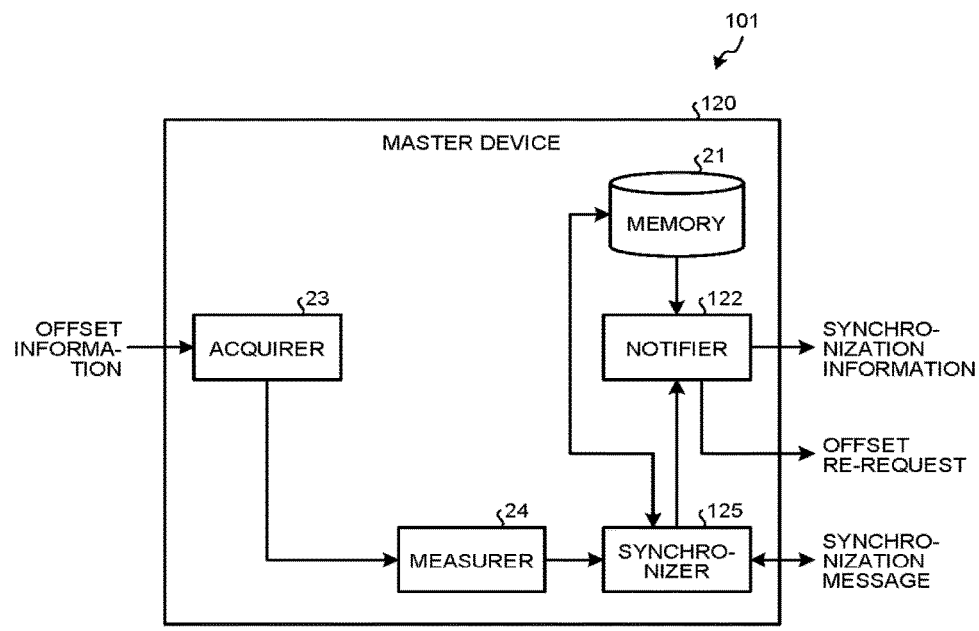
FIG. 7 is a schematic diagram illustrating an exemplary structure of a master device in the second embodiment.

FIG. 6 is a schematic diagram illustrating an exemplary structure of a management device 110 of a management system 101 in the second embodiment. FIG. 7 is a schematic diagram illustrating an exemplary structure of a master device 120 of the management system 101 in the second embodiment.

As illustrated in FIG. 6, the management device 110 includes an acquirer 111, a calculator 113, and a notifier 115 that differ from those in the first embodiment. As illustrated in FIG. 7, the master device 120 includes a notifier 122 and a synchronizer 125 that differ from those in the first embodiment.

The synchronizer 125 determines whether a first time period related to the current time synchronization is longer than a second time period related to the past time synchronization. Specifically, the synchronizer 125 determines whether the first time period is longer than the second time period every time the master device 120 performs the time synchronization with the slave device 30, which are management targets.

In the second embodiment, each of the first time period and the second time period is a round-trip time (RTT) period of communication between the master device 120 and the target slave device 30, and is obtained by the synchronizer 125 in the time synchronization sequence performed by the synchronizer 125 so as to perform the time synchronization with the target slave device 3. The first time period and the second time period are, however, not limited to the RTT periods.

In the second embodiment, the first time period is the RTT period of the current time synchronization, while the second time period is the RTT period of the previous time synchronization. The first time period and the second time period are, however, not limited to the RTT periods. For example, the second time period may be a statistical value such as an average of the RTT periods of the past several time synchronizations.

When the synchronizer 125 determines that the first time period is longer than the second time period, the notifier 122 performs an offset re-request that re-requests the offset information from the management device 110. The fact that the first time period is longer than the second time period means that confliction occurs in the network device 40 in the current time synchronization rather than the previous time synchronization. The offset re-request includes the master ID that identifies the master device 120.

The synchronizer 125 may, instead of comparing the first time period with the second time period, compare the first time period with a threshold, where the notifier 122 re-requests the offset information from the management device 110 when the first time period is larger than the threshold.

The acquirer 111 acquires the offset re-request from the master device 120.

The calculator 113 acquires the synchronization information that includes the master ID from the memory 17 using the master ID included in the offset re-request acquired by the acquirer 111, and calculates the time offset for the master device 120 indicated by the master ID on the basis of the synchronization information and random numbers. The calculator 113 calculates the time offset using expression (6) when the offset information is re-requested, for example.

$$\text{Time offset} = (\text{synchronization period} \pm /\text{the number of pieces of acquired synchronization information}) \times (i-1) + \text{random number value} \quad (6)$$

The random number value is a pseudorandom number value that is in a preset range from minus synchronization period$_i$, to synchronization period$_i$, and produced in accordance with a preliminarily designated probability distribution such as a uniform distribution or a normal distribution.

The notifier 115 notifies the master device 120 (the master device 120 indicated by the master ID) for which the time offset is calculated of the offset information that indicates the time offset calculated by the calculator 113.

Figure 8:
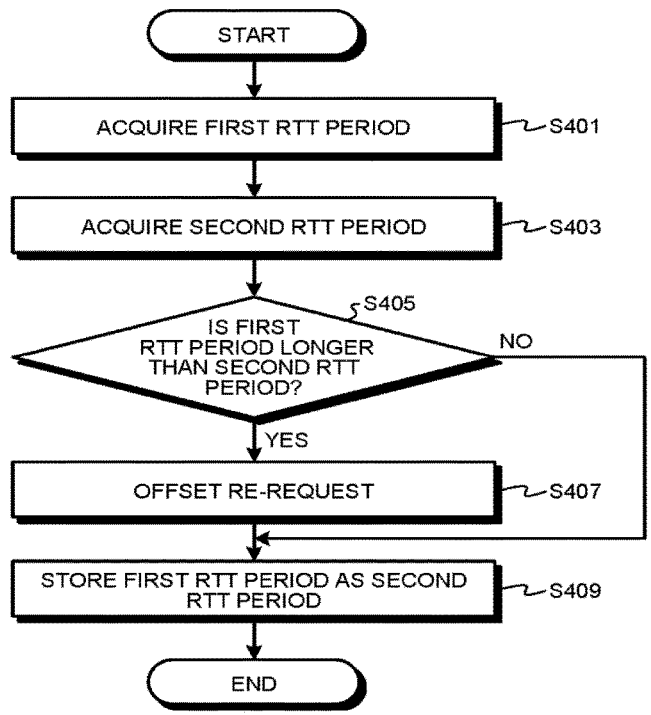
FIG. 8 is a flowchart illustrating an example of processing performed by the management system in the second embodiment.

FIG. 8 is a sequence diagram illustrating an exemplary flow of a procedure of the offset re-request performed by the management system 101 in the second embodiment.

The synchronizer 125 of the master device 120 acquires a first RTT period that is the RTT period of the current time synchronization (step S401) and a second RTT period that is the RTT period of the previous time synchronization from the memory 21 (step S403).

The synchronizer 125 determines whether the first RTT period is longer than the second RTT period (step S405).

If the first RTT period is longer than the second RTT period (Yes at step S405), the notifier 122 re-requests the offset information from the management device 110 (step S407). If the first RTT period is not longer than the second RTT period (No at step S405), the notifier 122 does not re-request the offset information.

The synchronizer 125 stores the first RTT period as the second RTT period in the memory 21 (step S409).

As described above, according to the second embodiment, when confliction due to the time synchronizations is likely to occur by resetting of the time offset, the resetting of the time offset can be automatically redone. Thus, according to the second embodiment, it is possible to easily avoid the occurrence of confliction due to the time synchronizations even when the time offset is reset.

To prevent frequent occurrence of the offset re-request, a limit may be set to the number of times for re-requesting the offset information for each master device 120. When the number of times exceeds the limit, no time offset may be calculated or an alert may be generated.

Third Embodiment

In the first and the second embodiments, descriptions are made on the basis that the measured times in the respective master devices coincide with each other before the time offsets are set. The explanation is given for a case in which it is unknown whether the measured times in the respective master devices coincide with each other before the time offsets are set. In the following description, differences from the first embodiment are mainly described. The same names and reference numerals as in the first embodiment are given to the elements having the same function, and description thereof is omitted.

Figure 9:
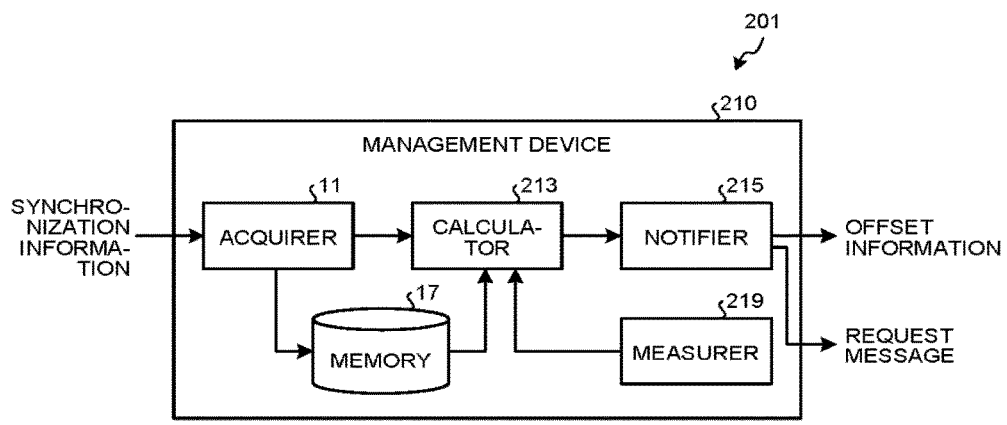
FIG. 9 is a schematic diagram illustrating an exemplary structure of a management device in a third embodiment.
Figure 10:
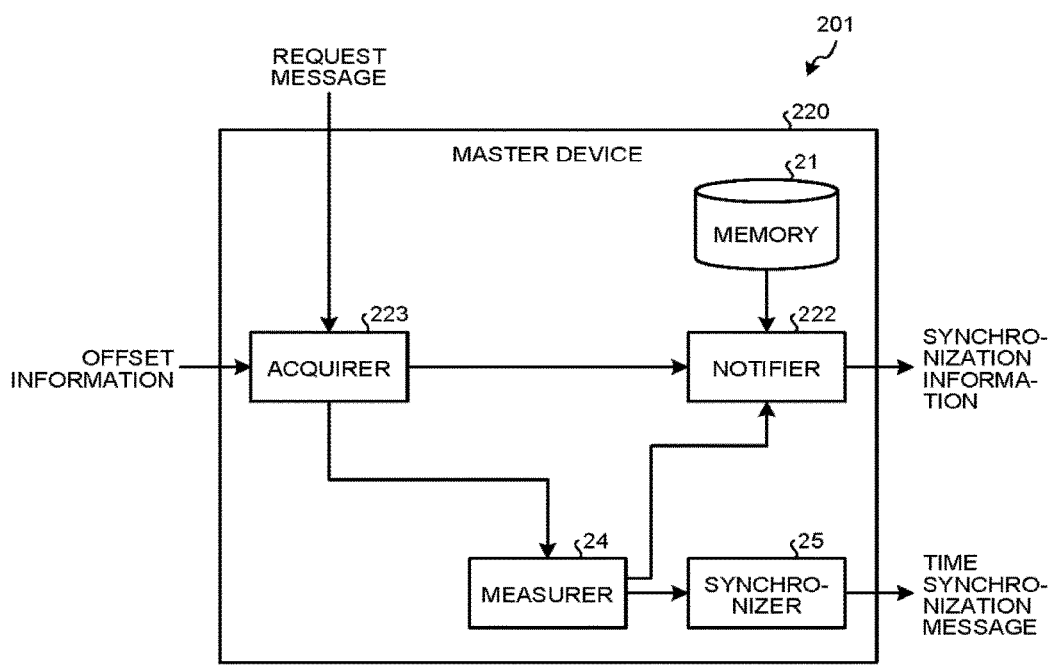
FIG. 10 is a schematic diagram illustrating an exemplary structure of a master device in the third embodiment.

FIG. 9 is a schematic diagram illustrating an exemplary structure of a management device 210 of a management system 201 in a third embodiment. FIG. 10 is a schematic diagram illustrating an exemplary structure of a master device 220 of the management system 201 in the third embodiment.

As illustrated in FIG. 9, the management device 210 includes a calculator 213, a notifier 215, and a time measurer 219 that differ from those in the first embodiment. As illustrated in FIG. 10, the master device 220 includes a notifier 222 and an acquirer 223 that differ from those in the first embodiment.

The time measurer 219 measures the time in the management device 210.

The notifier 215 notifies each master device 220 of a request message that requests the synchronization information from the master device 220.

The acquirer 223 acquires the request message.

When the acquirer 223 acquires the time request message, the notifier 222 notifies the management device 210 of the synchronization information that includes the measured time measured by the time measurer 219.

The calculator 213 calculates the time offset for each master device 220 on the basis of the synchronization information acquired by the acquirer 11 and the measured time measured by the time measurer 219.

Specifically, the calculator 213 calculates a time period from the request of the synchronization information to the acquisition of the synchronization information from the measured time measured by the time measurer 219 when the notifier 215 notifies the master device 220 of the request message and the measured time measured by the time measurer 219 when the acquirer 11 acquires the synchronization information from the master device 220. The calculator 213 calculates the communication delay time period between the master device 220 and the management device 210. The communication delay time period can be calculated by substituting the round-trip time period of the synchronization message with the time period from the request of the synchronization information to the acquisition of the synchronization information in expression (3).

The calculator 213 calculates a difference time period between the master device 220 and the management device 201 using the measured time measured by the time measurer 219 when the acquirer 11 acquires the synchronization information from the master device 220, the measured time that is included in the synchronization information and measured by the time measurer 24, and the calculated communication delay time period. The calculator 213 calculates the difference time period between the master device 220 and the management device 210 using expression (7), for example.

Difference time period=current time in management device 210−(time in master device 220+delay time period)     (7)

For the current time in the management device 210, the measured time measured by the time measurer 219 when the acquirer 11 acquires the synchronization information from the master device 220 may be used. For the time in the master device 220, the measured time that is measured by the time measurer 24 and included in the synchronization information may be used.

Furthermore, the calculator 213 calculates the time offset using the synchronization information acquired by the acquirer 11 and the calculated difference time period. The calculator 213 calculates, for each master device 220, the time offset using expression (8), for example.

Time offset=(synchronization period$_i$/the number of pieces of acquired synchronization information)×($i$−1)−difference time period$_i$     (8)

In this way, the difference time period between the master device 220 and the management device 210 is preliminarily subtracted from the time offset, thereby making it possible to avoid a case where the measured times in the respective master devices 220 after the time offsets coincide with each other even when the measured times in the respective master devices 220 differ from each other before the time offsets are set.

Figure 11:
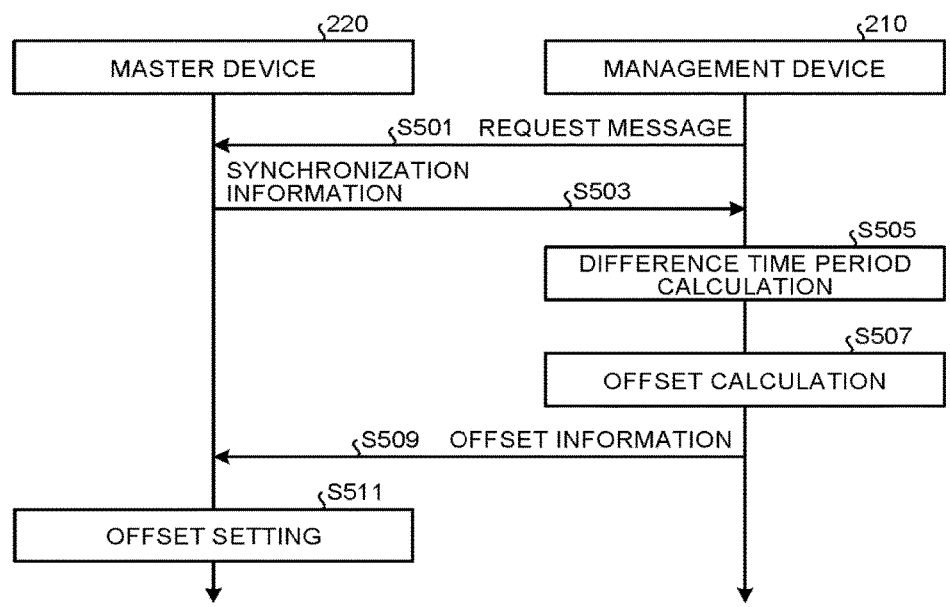
FIG. 11 is a sequence diagram illustrating an example of processing performed by the management system in the third embodiment.

FIG. 11 is a sequence diagram illustrating an exemplary flow of a procedure of processing performed by the management system 201 in the third embodiment.

The notifier 215 of the management device 210 notifies the master device 220 of the request message that requests the synchronization information from the master device 220. The acquirer 223 of the master device 220 acquires the request message (step S501).

The notifier 222 of the master device 220 acquires the synchronization information on the master device 220 from the memory 21, and notifies the management device 210 of the synchronization information that includes the measured time measured by the time measurer 24. The acquirer 11 of the management device 210 acquires the synchronization information (step S503).

The calculator 213 of the management device 210 calculates the communication delay time period between the master device 220 and the management device 210 using expression (3), and the difference time period between the master device 220 and the management device 210 using expression (7) (step S505).

The calculator 213 of the management device 210 calculates the time offset using expression (8) (step S507).

The notifier 215 of the management device 210 notifies the master device 220 of the offset information indicating the time offset calculated by the calculator 213. The acquirer 223 of the master device 220 acquires the offset information (step S509).

The time measurer 24 of the master device 220 sets the time offset indicated by the offset information and changes the measured time to a time obtained by offsetting the measured time with the time offset indicated by the offset information (step S511).

When the changed measured time reaches a certain time, the synchronizer 25 of the master device 220 performs the time synchronization with the slave device 30, which is a management target, at the changed measured time, which is not illustrated in FIG. 11.

As described above, according to the third embodiment, the difference time period between the master device 220 and the management device 210 is preliminarily subtracted from the time offset, thereby making it possible to avoid a case where the measured times in the respective master devices 220 after the time offsets coincide with each other even when the measured times in the respective master devices 220 differ from each other before the time offsets are set.

Hardware Structure

Figure 12:
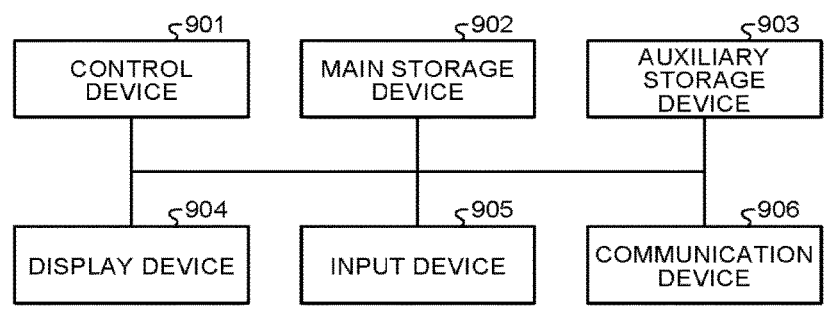
FIG. 12 is a schematic diagram illustrating an exemplary hardware structure of the respective devices in the respective embodiments.

FIG. 12 is a schematic diagram illustrating an exemplary hardware structure of the management devices and master devices in the respective embodiments (hereinafter described as the respective devices in the respective embodiments). As illustrated in FIG. 12, the respective devices in the respective embodiments each have a hardware configuration utilizing a normal computer. Specifically, the device includes a control device 901 such as a CPU, a main storage device 902 such as a ROM or a RAM, an auxiliary storage device 903 such as an HDD or an SSD, a display device 904 such as a display, an input device 905 such as a keyboard or a mouse, and a communication device 906 such as a communication interface.

The programs executed by the respective devices in the respective embodiments are stored and provided in a computer-readable storage medium such as a compact disc read only memory (CD-ROM), a compact disc recordable (CD-R), a memory card, a digital versatile disc (DVD), or a flexible disk (FD), as an installable or executable file.

The programs executed by the respective devices in the respective embodiments may be stored in a computer connected to a network such as the Internet and provided by being downloaded via the network. Furthermore, the programs executed by the respective devices in the respective embodiments may be provided or distributed via a network such as the Internet. The programs executed by the respective devices in the respective embodiments may be embedded and provided in a ROM, for example.

The programs executed by the respective devices in the respective embodiments each have a module structure that achieves the respective units described above in a computer. In practical hardware, the CPU reads out the programs from the HDD, the ROM, or the like to the RAM so as to execute the programs, so that the respective units described above can be achieved in the computer. When at least a part of the respective units is achieved by hardware such as an IC, the respective devices in the respective embodiment may each further include the IC.

The steps in the flowcharts of the respective embodiments may be changed in execution order, some steps may be executed simultaneously, or the steps may be executed in different order, every implementation without departing from their roles.

As described above, according to the embodiments, the occurrence of confliction due to the time synchronizations can be avoided even under the standard under which the time synchronization timing should be set at a given time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A management device, comprising:
a memory; and
one or more processors configured to function as a calculator and notifier, wherein
the calculator calculates a time offset for each of master devices performing, when a measured time reaches a certain time, time synchronization with a slave device, which is a management target, at the measured time; and
the notifier notifies each of the master devices of a change notification causing each of the master devices to change the measured time to a time obtained by offsetting the measured time with the time offset, wherein
the one or more processors are configured to function as an acquirer,
the acquirer acquires, for each master device, synchronization information on time synchronization, the synchronization information including period information that indicates a synchronization period in which the time synchronization is performed, and
the calculator calculates, for each of the master devices, the time offset in accordance with the following expression:

time offset=(synchronization period/number of pieces of acquired synchronization information)×a natural number that is unique to each of the master devices and smaller than the number of pieces of acquired synchronization information, whereby the management device sets time offsets differing from one another to the master devices so that measured times are shifted from one another to avoid an occurrence of confliction due to the time synchronization.

2. The device according to claim 1, wherein
the calculator calculates the time offset for each of one or more master devices from each of which the synchronization information has been acquired when the acquirer acquires the synchronization information, and
the notifier notifies, every time the time offset is calculated, each of the master devices for which the time offset is calculated of offset information that indicates the time offset.

3. The device according to claim 1, wherein the calculator calculates, for each of the master devices, the time offset on the basis of uniformly distributed random numbers.

4. A management system, comprising:
a management device; and
master devices, wherein
the management device includes:
a memory; and
one or more processors configured to function as a first calculator, first notifier, and a first acquirer, wherein
the first calculator calculates a time offset for each of the master devices each performing, when a measured time reaches a certain time, time synchronization with a slave device, which is a management target, at the measured time;
the first notifier notifies each of the master devices of offset information indicating the time offset; and
the first acquirer acquires, for each of the master devices, the synchronization information, the synchronization information including period information that indicates a synchronization period in which the time synchronization is performed, wherein
the first calculator calculates, for each of the master devices, the time offset in accordance with the following expression:

time offset=(synchronization period/number of pieces of acquired synchronization information)×a natural number that is unique to each of the master devices and smaller than the number of pieces of acquired synchronization information, and each of the master devices includes:
a memory; and
one or more processors configured to function as a second acquirer, a first time measurer, synchronizer, and a second notifier, wherein
the second acquirer acquires the offset information;
the first time measurer measures a time and changes the measured time to a time obtained by offsetting the measured time with the time offset indicated by the offset information;
the synchronizer performs the time synchronization with the slave device at the changed measured time when the changed measured time reaches the certain time; and
the second notifier notifies the management device of synchronization information on the time synchronization, whereby
the management device sets time offsets differing from one another to the master devices so that measured times are shifted from one another to avoid an occurrence of confliction due to the time synchronization.

5. The system according to claim 4, wherein
the first calculator calculates the time offset for each of one or more master devices from each of which the synchronization information has been acquired when the first acquirer acquires the synchronization information, and the first notifier notifies, every time the time offset is calculated, each of the master devices for which the time offset is calculated of the offset information indicating the time offset.

6. The system according to claim 5, wherein
the synchronizer determines whether a first time period related to current time synchronization is longer than a second time period related to past time synchronization,
the second notifier re-requests the offset information from the management device when the first time period is longer than the second time period,
the first acquirer acquires the re-request,
the first calculator calculates the time offset on the basis of the synchronization information and a random number when the first acquirer acquires the re-request, and
the first notifier notifies each of the master devices for which the time offset is calculated of the offset information indicating the time offset.

7. The system according to claim 6, wherein, when the first acquirer acquires the re-request, the first calculator calculates the time offset in accordance with the following expression:

time offset=(synchronization period/number of pieces of acquired synchronization information)×a natural number that is unique to each of the master devices and smaller than the number of pieces of acquired synchronization information+a random number value.

8. The system according to claim 4, wherein the first calculator calculates, for each of the master devices, the time offset on the basis of uniformly distributed random numbers.

9. The system according to claim 4, wherein
the first notifier notifies each master device of a request message that requests the synchronization information,
the first acquirer acquires the request message,
the second notifier notifies the management device of the synchronization information that includes the measured time measured by the first time measurer when the second acquirer acquires the request message,
the management system further includes a second time measurer that measures a time, and
the first calculator calculates, for each of the master devices, the time offset on the basis of the synchronization information and the measured time measured by the second time measurer.

10. The system according to claim 9, wherein the first calculator calculates, for each of the master devices, a difference time period between the measured time measured by the first time measurer and the measured time measured by the second time measurer, and calculates the time offset on the basis of the synchronization information and the difference time period.

11. The system according to claim 10, wherein the first calculator calculates, for each of the master devices, the time offset in accordance with the following expression:

time offset=(synchronization period/number of pieces of acquired synchronization information)×a natural number that is unique to each of the master devices and smaller than the number of pieces of acquired synchronization information−difference time period.

12. A management method, comprising:
calculating a time offset for each of master devices performing, when a measured time reaches a certain time, time synchronization with a slave device, which is a management target, at the measured time; and
notifying each of the master devices of a change notification causing each of the master devices to change the measured time of each of the master devices to a time obtained by offsetting the measured time with the time offset, wherein
the management method further comprises:
acquiring, for each master device, synchronization information on time synchronization, the synchronization information including period information that indicates a synchronization period in which the time synchronization is performed, and
the calculating includes calculating, for each of the master devices, the time offset in accordance with the following expression:

time offset=(synchronization period/number of pieces of acquired synchronization information)×a natural number that is unique to each of the master devices and smaller than the number of pieces of acquired synchronization information, whereby the management method sets time offsets differing from one another to the master devices so that measured times are shifted from one another to avoid an occurrence of confliction due to the time synchronization.

* * * * *